(12) United States Patent
Richter

(10) Patent No.: US 8,388,073 B2
(45) Date of Patent: Mar. 5, 2013

(54) MODULAR STORAGE UNITS

(75) Inventor: Thomas S. Richter, Wauseon, OH (US)

(73) Assignee: Adrian Steel Co., Adrian, MI (US)

(*) Notice: Subject to any disclaimer, the term of this patent is extended or adjusted under 35 U.S.C. 154(b) by 630 days.

(21) Appl. No.: 11/541,859

(22) Filed: Oct. 2, 2006

(65) Prior Publication Data
US 2007/0145865 A1 Jun. 28, 2007

Related U.S. Application Data

(60) Provisional application No. 60/722,751, filed on Sep. 30, 2005.

(51) Int. Cl.
*A47B 87/00* (2006.01)
(52) U.S. Cl. .................. 312/108; 312/111; 312/263
(58) Field of Classification Search .......... 312/107–111, 312/257.1, 263, 265.5, 265.6, 330.1, 348.3, 312/198, 203, 264; 403/238–240, 348; 411/349, 411/549, 553
See application file for complete search history.

(56) References Cited

U.S. PATENT DOCUMENTS

| | | | |
|---|---|---|---|
| 3,486,205 A | 12/1969 | Smith | |
| 3,552,817 A * | 1/1971 | Marcolongo | 312/107 |
| 3,563,624 A * | 2/1971 | Stice | 312/111 |
| 3,722,971 A * | 3/1973 | Zeischegg | 312/107 |
| 3,816,883 A | 6/1974 | Dzus, Sr. et al. | |
| 3,848,942 A * | 11/1974 | Fanini | 312/265.5 |
| 3,849,839 A | 11/1974 | Zimber | |
| 3,868,123 A * | 2/1975 | Berg et al. | 280/79.2 |
| 3,999,818 A | 12/1976 | Schankler | |
| 4,762,437 A | 8/1988 | Mitomi | |
| 5,368,427 A | 11/1994 | Pfaffinger | |
| 5,466,058 A * | 11/1995 | Chan | 312/111 |
| 5,913,580 A * | 6/1999 | Liu | 312/108 |
| 6,193,340 B1 | 2/2001 | Schenker et al. | |
| 6,488,346 B2 * | 12/2002 | Chen | 312/263 |
| 6,820,950 B1 * | 11/2004 | Sun | 312/108 |
| 6,942,306 B2 | 9/2005 | Youngs et al. | |
| 2002/0109442 A1 * | 8/2002 | Hsu | 312/263 |
| 2003/0173878 A1 | 9/2003 | Youngs et al. | |
| 2005/0194871 A1 | 9/2005 | Youngs et al. | |

FOREIGN PATENT DOCUMENTS

| | | |
|---|---|---|
| CA | 2112426 | 7/1994 |
| CA | 2321405 | 4/2001 |

* cited by examiner

Primary Examiner — James O Hansen
Assistant Examiner — Daniel Rohrhoff
(74) Attorney, Agent, or Firm — Bill C. Panagos; Linda D. Kennedy; Butzel Long

(57) ABSTRACT

Modular storage units that can be assembled without additional fasteners or tools and then coupled together with or without optional shelves into an overall storage system using a common twist-lock fastener. The modular storage units are assembled from top, bottom and side panels. The top and bottom panels for each modular storage unit are structurally identical as are the side panels. Modular storage units having different widths have commonly sized and structurally identical side panels. Storage systems that are built up from the modular storage units can be easily assembled in work vehicles and other close quarters or tight spaces. The modular storage units can include plurality of trays or other articles for storing various parts, articles, etc.

15 Claims, 10 Drawing Sheets

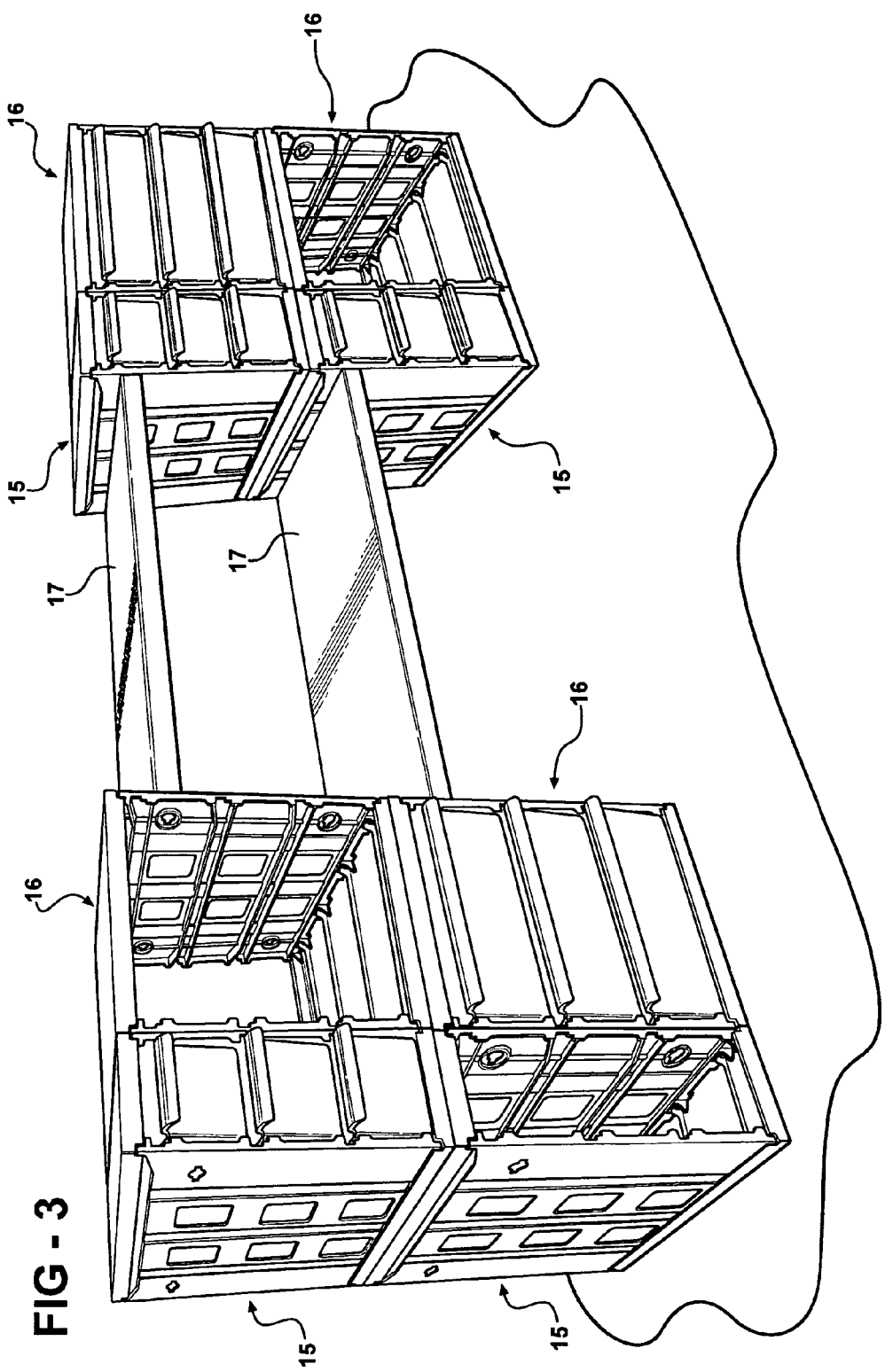

MODULAR STORAGE UNITS

RELATED APPLICATIONS

This application is based on U.S. Provisional Patent Application Ser. No. 60/722,751, filed Sep. 30, 2005 and claims priority thereto under 35 U.S.C. §120.

TECHNICAL FIELD

The present invention relates to storage units that are designed, configured and assembled in various locations. More particularly the present invention relates to modular storage units that can be assembled with a single, simple tool and coupled together into various configurations to accommodate a variety of storage locations and articles to be stored.

BACKGROUND ART

Storage units for vehicles in the form of fixed and movable bins and cabinets having various types of drawers and trays are known. However, in many cases the storage units have to be assembled from many parts, some of which have to be cut or formed to length for a particular application. Often the parts of storage units have to be fastened together using bolts, washers, lock washers, nuts, lock nuts, etc. Such fastening, which of itself can be tedious, becomes more complicated and challenging when assembling storage units in close quarters or tight spaces such as in work vehicles, e.g., vans, trucks, etc.

In some instances in which the assembly of storage units requires access to either side of a fastener joint, it can be impractical to assemble the storage units in place and necessary to pre-assembly the storage units into an overall configuration and then install the pre-assembled units in place. This manner of installation too can be challenging when trying to install a large overall storage unit assembly.

The present invention provides for modular storage units that can be individually assembled with simple common fasteners and a single tool and, thereafter the individual modular units can be combined and fastened together into virtually any configuration using the same tool which can be used without having to access both side of a fastened point.

DISCLOSURE OF THE INVENTION

According to various features, characteristics and embodiments of the present invention which will become apparent as the description thereof proceeds, the present invention provides a system of modular storage units that comprise:

a plurality of modular storage units that comprise top, bottom and side panels that are snap-fit assembled together exclusive of any additional mechanical fasteners; and twist-lock fasteners that are used to fasten two or more of the modular storage units together.

BRIEF DESCRIPTION OF DRAWINGS

The present invention will be described with reference to the attached drawings which are given as non-limiting examples only, in which:

FIG. 3 is a perspective view that depicts one manner in which a plurality of the individual modular storage units can be assembled together in and overall storage assembly.

BEST MODE FOR CARRYING OUT THE INVENTION

Figure 1:
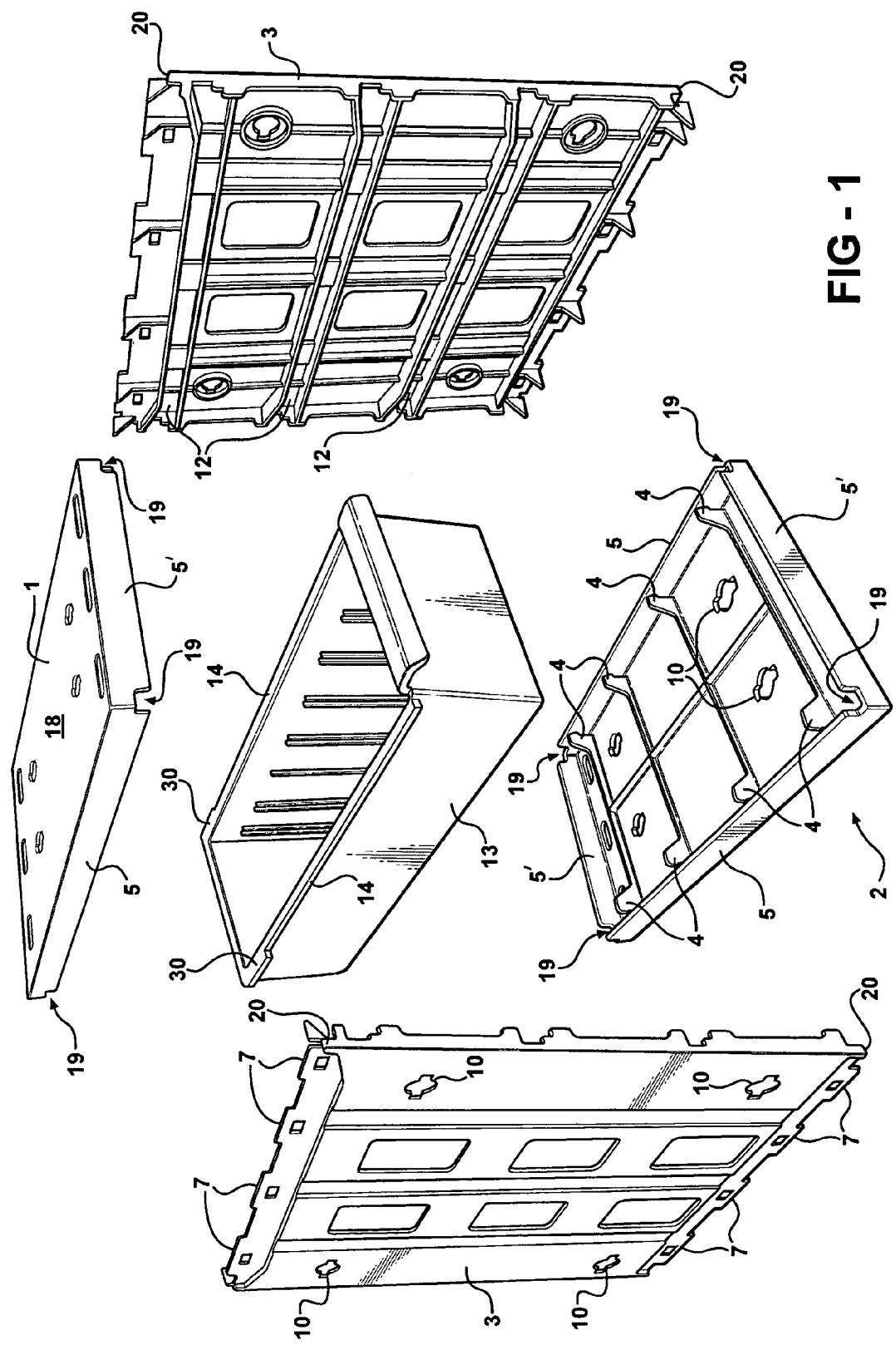
FIG. 1 is an exploded view of a modular storage unit according to one embodiment of the present invention.

The present invention is directed to modular storage units that can be assembled with a single, simple tool and coupled together into various configurations to accommodate a variety of storage locations and articles to be stored. The modular storage units can be individually assembled in different sizes using common symmetric side panels and symmetric top/bottom panels that have different widths. Once the individual modular storage units are assembled, any number of the individual modular storage units can be joined, side-to-side and/or top-to-bottom to each other to develop an overall configuration that can be adaptable to any available space.

The side panels and top/bottom panels are assembled together without the use of auxiliary mechanical fasteners, and the individual modular storage units are jointed together using a particular fastener that can be manipulated with a simple tool. Thus, according to one example, a complete overall storage system having any combination of two different sized modular units can be assembled using only three basic parts, including the common top/bottom panels, two different sized side panels and the fasteners of the present invention. Moreover, by merely adding more different sized side panels further different sized individual modular units can be provided and assembled together.

The ability of joining or fastening individual modular storage units together provides a great amount of flexibility when developing an overall storage system in the confines of a work vehicle or other limited or irregular shaped area. In addition to the modular storage units, shelf units can be included that are configured to be joined between two of the modular storage units and provide shelf space where desired in an overall storage system.

According to one embodiment, the storage units are configured to support trays therein which slide between a closed and an open position. The trays are received in channels that are provided in the side plates. The trays are provided with abutting structures which cooperate with abutments that are formed along the channels to prevent the trays from opening and from being removed from the storage units accidentally.

In other embodiments the storage units could be configured to receive shelves, bins, baskets, drawers, doors, etc. that slide and/or pivot between closed and open positions.

According to one embodiment, the side panels and top/bottom panels are provided with a pattern of through-holes that are configured to receive the fasteners. The through-holes are arranged in patterns that repeat from a basic pattern so as to allow the through-holes on adjacent storage units to be aligned in various positions in which the storage units can be fastened together. When shelves are used and coupled/fastened together with a group of storage units in an overall storage system, the shelves also include a pattern of through-holes that can be aligned with the through-holes on adjacent ones of the storage units.

Although the side and top/bottom panels could be provided with through-holes that are configured, e.g. internally threaded, to receive any type of mechanical fastener, according to one embodiment of the present invention a twist-lock fastener has been designed and found particularly suitable for quick assembly. Moreover, the twist-lock fastener is designed and configured so as not to become lose or disengaged due to vibration, shaking, etc. which the storage units can experience when assembled in a work vehicle such as a van.

FIG. 1 is an exploded view of a modular storage unit according to one embodiment of the present invention. As shown, the modular storage unit includes a top panel 1, a bottom panel 2 and opposite side panels 3 which are configured to interlock together without the use of any additional mechanical fasteners. The top panel 1 and the bottom panel 2 are identical and can be formed from a common mold. Likewise, the opposite side panels 3 are identical and can be formed from a common mold.

As discussed in more detail below, the top and bottom edges of the top and bottom panels 1, 2 are provided with engagement structures 4 that are spaced apart from side walls 5 by gaps 6 (FIG. 9), which gaps 6 are configured to receive projections 7 (FIG. 9) that are provided on the tops and bottoms of the side panels 3. The engaging structures 4 include catches 8 that snap-fit into through-holes 9 provided in the projections 7 of the side panels 3 as discussed below. The cooperating structures provided on the opposite side panels 3 and top and bottom panels 1, 2 secure the modular units together as discussed below. These features allow the individual modular storage units to be assembled without any tools, by merely "snapping" the opposite side panels 3 together with the top and bottom panels 1, 2.

According to one embodiment of the present invention, differently sized top and bottom panels 1, 2 are used together with commonly sized opposite side panels 3. For example, modular storage units having dimensions (height, width and depth) of 12×12×12 inches can be assembled from side panels that are 12×12 inches and top and bottom panels that are 12×12 inches, and modular storage units having dimensions 12×6×12 inches can be assembled from the same side panels (that are 12×12 inches) and top and bottom panels that are 6×12 inches. Using the same side panels results in the modular storage units having the same depth which can provide a more stable base for fastening multiple modular units on top of one another. Alternatively, differently sized opposite side panels 3 can be used together with commonly sized top and bottom panels, is desired.

The opposite side panels 3 and top and bottom panels 1, 2 are provided with fastener through-holes 10 that are arranged in a particular pattern that allows individual modular storage units to be assembled or fastened together in various configurations. According to one embodiment of the present invention that is discussed in more detail below, the fastening through-holes 10 have a particular shape that is configured to receive twist-lock fasteners 11 (FIG. 7) which can be inserted through aligned fastener through-holes 10 of adjacent panels and turned to fasten the adjacent panels together.

The opposite side panels 3 are provided with tray support channels 12 that are configured to slidingly receive and support the side edges of trays 13 therein. As noted above, the opposite side panels 3 could alternatively be configured to receive shelves, bins, baskets, drawers, doors, etc. that slide and/or pivot between closed and open positions.

FIG. 1 depicts a tray 13 that has guides 14 that are received in the tray support channels 12. In other embodiments the storage units could be configured to receive shelves, bins, baskets, etc. that slide and/or pivot between closed and open positions.

Figure 2:
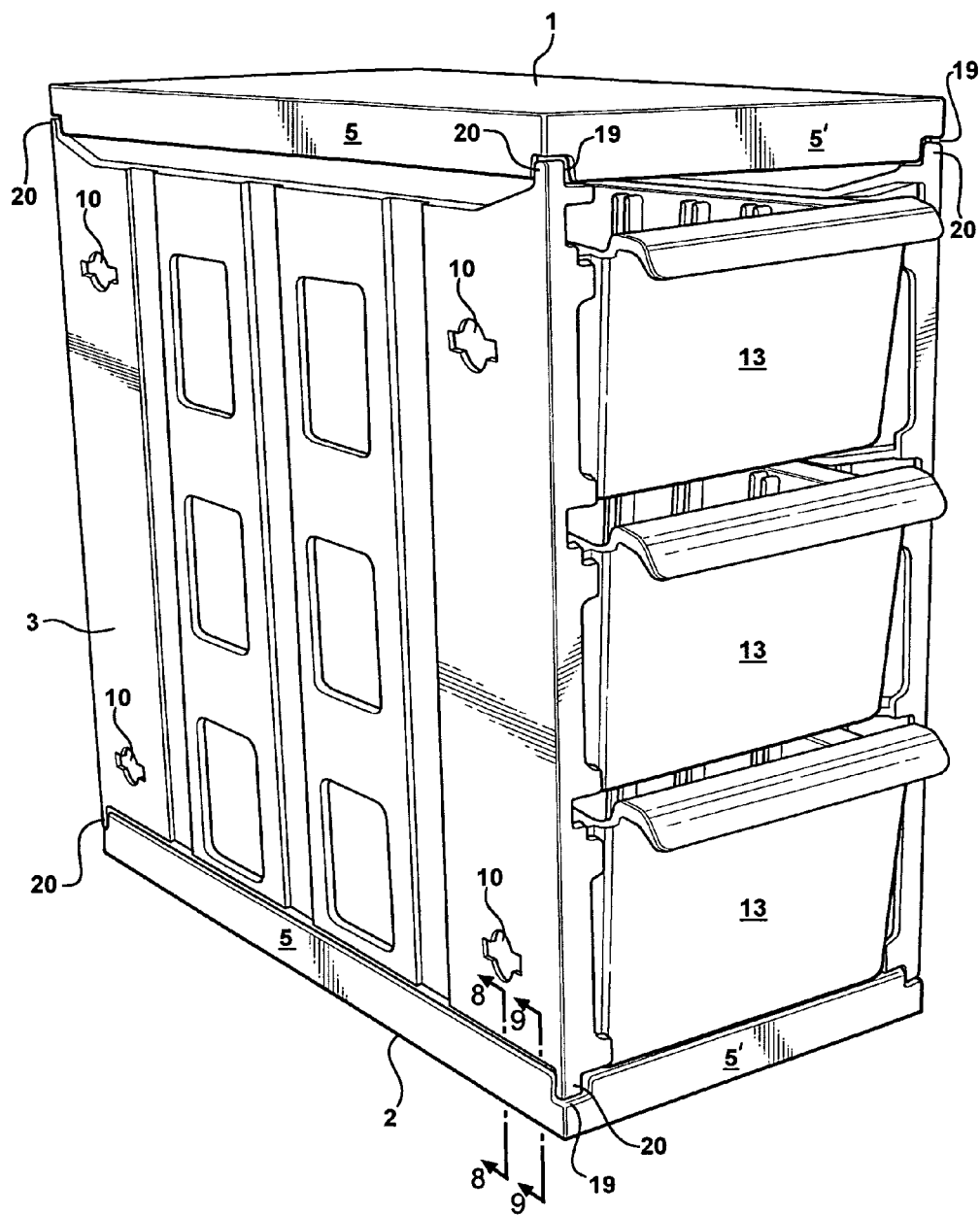
FIG. 2 is a perspective view of a modular storage unit according to one embodiment of the present invention.

FIG. 2 is a perspective view of a modular storage unit according to one embodiment of the present invention. The modular storage units of the present invention are assembled by pressing the projections 7 that are provided on the tops and bottoms of the side panels 3 into the gaps 6 defined between the engagement structures 4 and the side walls 5 of the top and bottom panels 1, 2. The resulting box-shaped structure that can be rectangular or cubic forms a basic modular storage unit which can be fastened together with other modular storage units as discussed herein.

FIG. 3 is a perspective view that depicts one manner in which a plurality of the individual modular storage units can be assembled together in and overall storage assembly. The overall storage assembly depicted in FIG. 3 includes individual modular storage units that are relatively small or narrow 15 and those that are relatively large or wide 16. In addition, FIG. 3 depicts shelves 17 that can be incorporated into the overall storage assembly. The shelves 17 include opposed sides that are provided with fastening through-holes 10. The fastening through-holes 10 provided in the sides of the shelves 17 are position so that they can be aligned with the fastening through-holes 10 provided in the side panels 3 of any one of the individual modular storage units. Thus once aligned, the fasteners 11 discussed herein can inserted through the fastening through-holes 10 in the shelves and the aligned fastening through-holes 10 in an adjacent side panel 3 and used to secure each side of the shelves 17 to the modular storage units.

It is to be understood that the overall storage system depicted in FIG. 3 is merely a non-limiting example inasmuch as the individual modular storage units can be arranged and fastened together (with or without shelves 17) in an unlimited number of configurations. Moreover, three or more different sized modular units (having different heights, widths and/or depths) could be combined rather than two sizes as depicted in FIG. 3. In addition, shelves 17 having different lengths could be incorporated into an overall storage system. Alternatively, open-top bins could be configured with sides and particularly upper sides with though-holes that allow such bins to be coupled between the sides of two storage modules in a manner similar to how the shelves 17 are coupled between the sides of two storage modules.

Figure 4A:
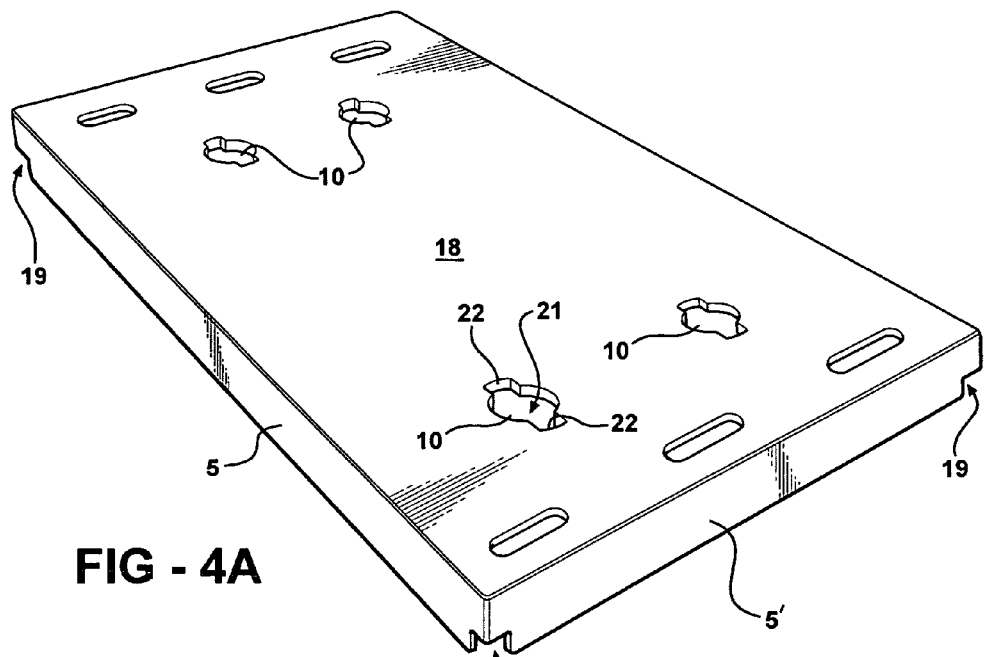
FIG. 4A is a perspective view of the outside of a top/bottom panel according to one embodiment of the present invention.
Figure 4B:
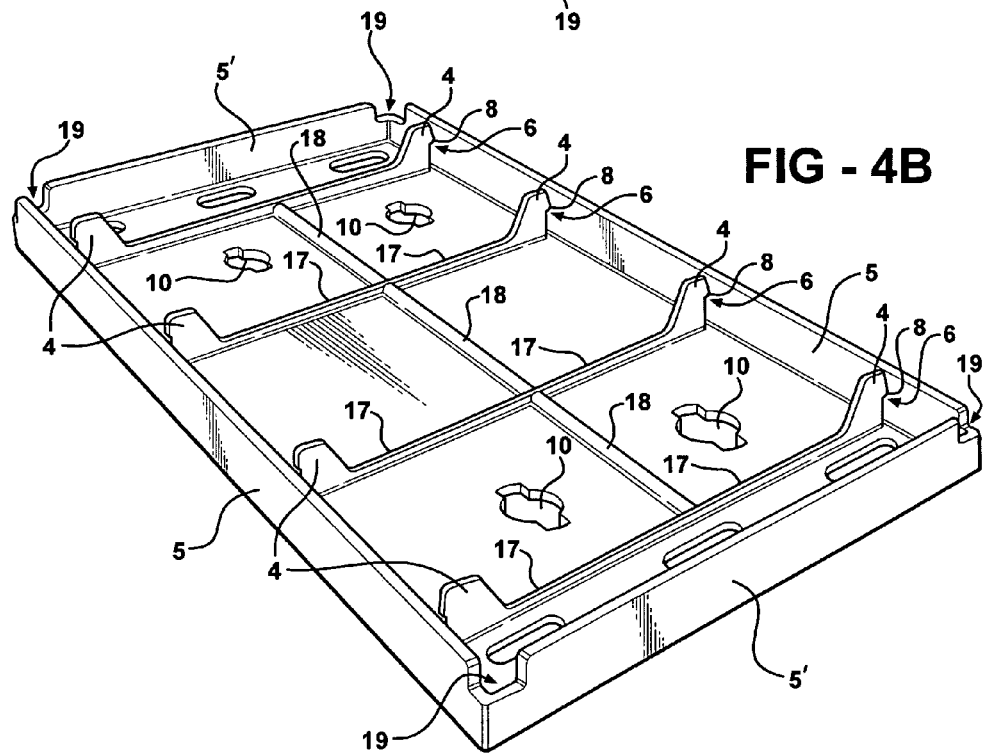
FIG. 4B is a perspective view of the inside of the top/bottom panel of FIG. 4A.

FIG. 4A is a perspective view of the outside of a top/bottom panel according to one embodiment of the present invention. FIG. 4B is a perspective view of the inside of the top/bottom panel of FIG. 4A. It is noted that the top panels 1 and the bottom panels 2 are structurally identical. Accordingly, FIGS. 4A and 4B (and 5A and 5B) refer to top/bottom panels and although the discussion of a top panel is made in reference to FIGS. 4A and 4B (and 5A and 5B) structural features discussed also apply to the bottom panels 2. The top panel 1 includes a generally flat rectangular or square body having peripheral side and end walls 5, 5' that extend inwardly (when assembled in a modular storage unit). The engagement structures 4 discussed above are located near the side walls 5 and are spaced apart from side walls 5 by gaps 6, which gaps 6 are configured to receive the projections 7 (FIG. 6a) that are provided on the tops and bottoms of the side panels 3. The engaging structures 4 include catches 8 that snap-fit into through-holes 9 provided in the projections 7 of the side panels 3 as discussed below. In the embodiment depicted in FIGS. 4A and 4B the engaging structures 4 are provided on reinforcing or strengthening ribs 17 that extend between the sides walls 5 of the top panel 1. Additional reinforcing or strengthening ribs 18 extend between the ends walls 5' of the top panel 1 as shown. The configuration of the reinforcing or strengthening ribs can be varied as desired.

The side and end walls 5, 5' have cut-out corners portions 19 which, as shown in FIG. 2 are configured to receive corner posts 20 that are provided on the side panels 3 for stabilizing assembled modular storage units.

The outside surface 18 of the top panel 1 depicted in FIG. 4A provides a generally flat profile that allows the resulting modular storage units to sit flat on a support surface and to be stacked and fastened together on top of one another.

The top panel 1 includes a pattern of fastening through-holes 10. In the illustrated embodiment, the fastening through-holes 10 have a circular central portion 21 and diametrically opposed radially extending slots 22. This particular configuration of the fastening through-holes 10 is designed to receive a twist fastener 11 (FIG. 7) that includes a circular shaft 23 with diametrically opposed protrusions 24 extending outward there from at the end of the circular shaft 23.

Figure 5A:
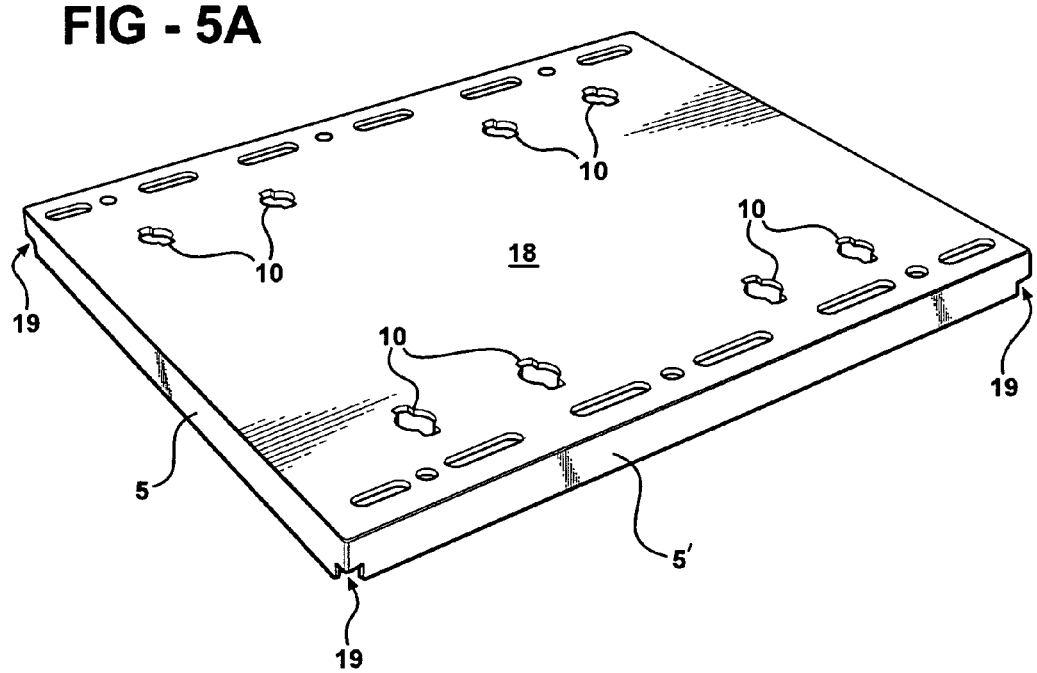
FIG. 5A is a perspective view of the outside of a top/bottom panel according to one embodiment of the present invention.
Figure 5B:
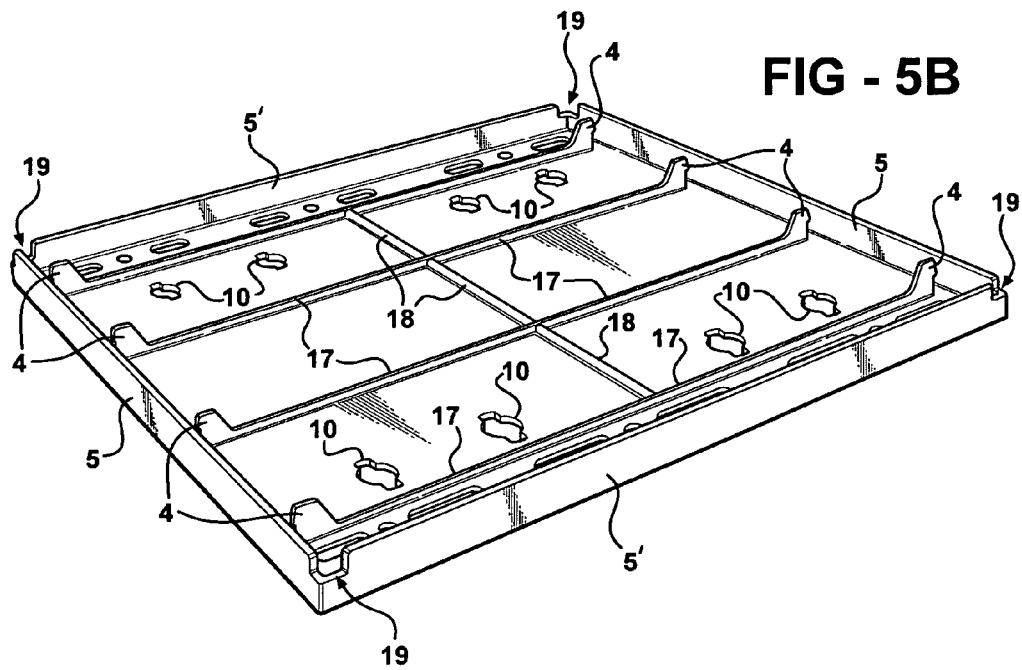
FIG. 5B is a perspective view of the inside of the top/bottom panel of FIG. 5A.

FIG. 5A is a perspective view of the outside of a top/bottom panel according to one embodiment of the present invention. FIG. 5B is a perspective view of the inside of the top/bottom panel of FIG. 5A. The top panel 1 depicted in FIGS. 5A and 5B has a width that is approximately twice the width of the top panel 1 depicted in FIGS. 4A and 4B. The only significant structural difference between the top panel 1 depicted in FIGS. 5A and 5B is the pattern of the reinforcing or strengthening ribs 17, 18 and the pattern of the fastening through-holes 10. In FIGS. 4A and 4B the top panel 1 has a pattern of four fastening through-holes 10. In FIGS. 5A and 5B the top panel 1 has a pattern of eight fastening through-holes 10 howbeit the eight fastening through-holes 10 in FIGS. 5A and 5B are arranged so as to repeat the pattern of the four fastening through-holes 10 depicted in FIGS. 4A and 4B. This will allow a bottom panel 2 having the configuration depicted in FIGS. 4A and 4B to be position on the top panel 1 depicted in FIGS. 5a and 5B so that the four fastening through-holes 10 therein are aligned with either the four fastening through-holes 10 on the right side or the left side as shown in FIG. 5A. Other patterns of fastening through-holes 10 could be used as desired.

Figure 6A:
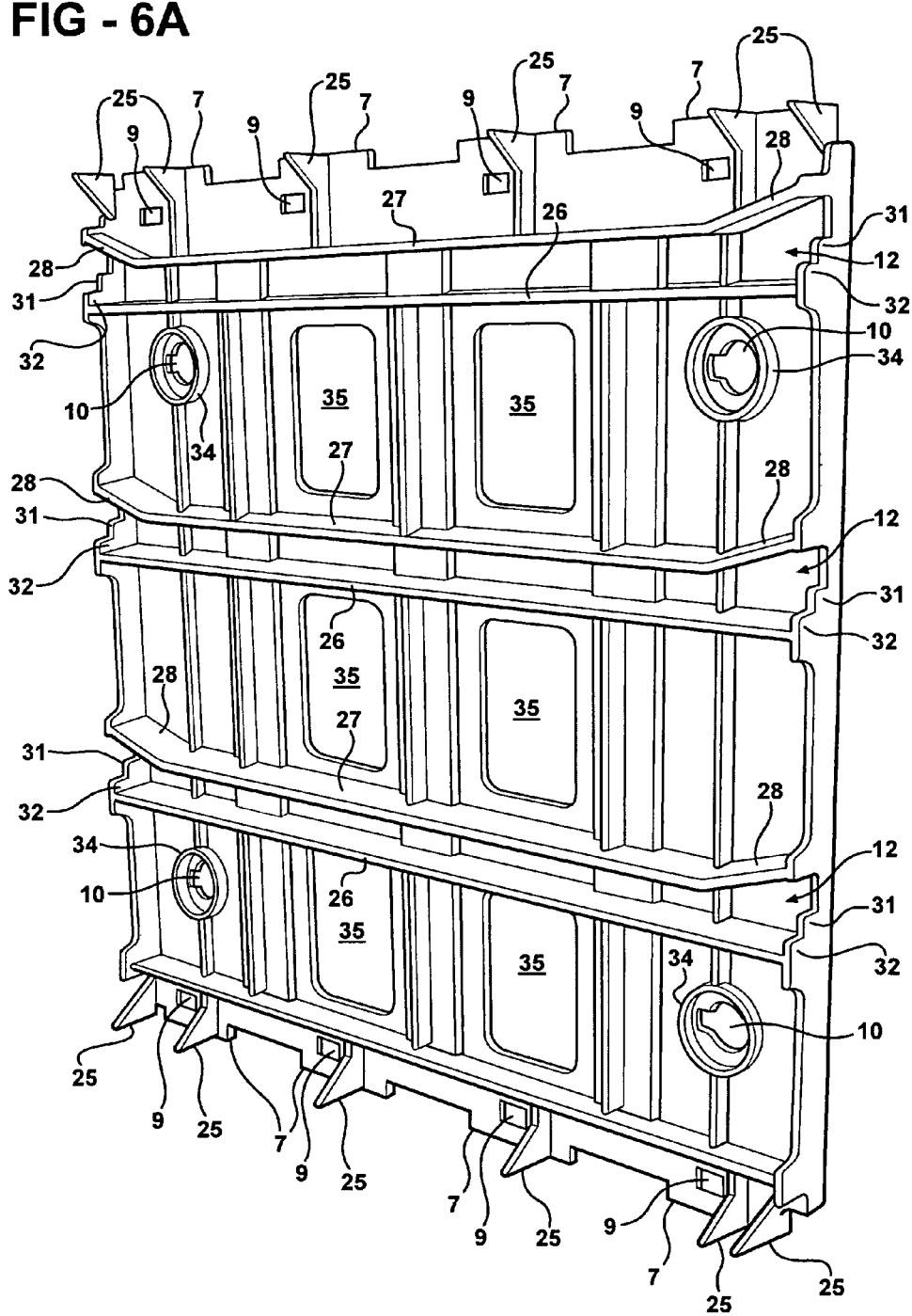
FIG. 6A is a perspective view of the inside of a side panel according to one embodiment of the present invention.
Figure 6B:
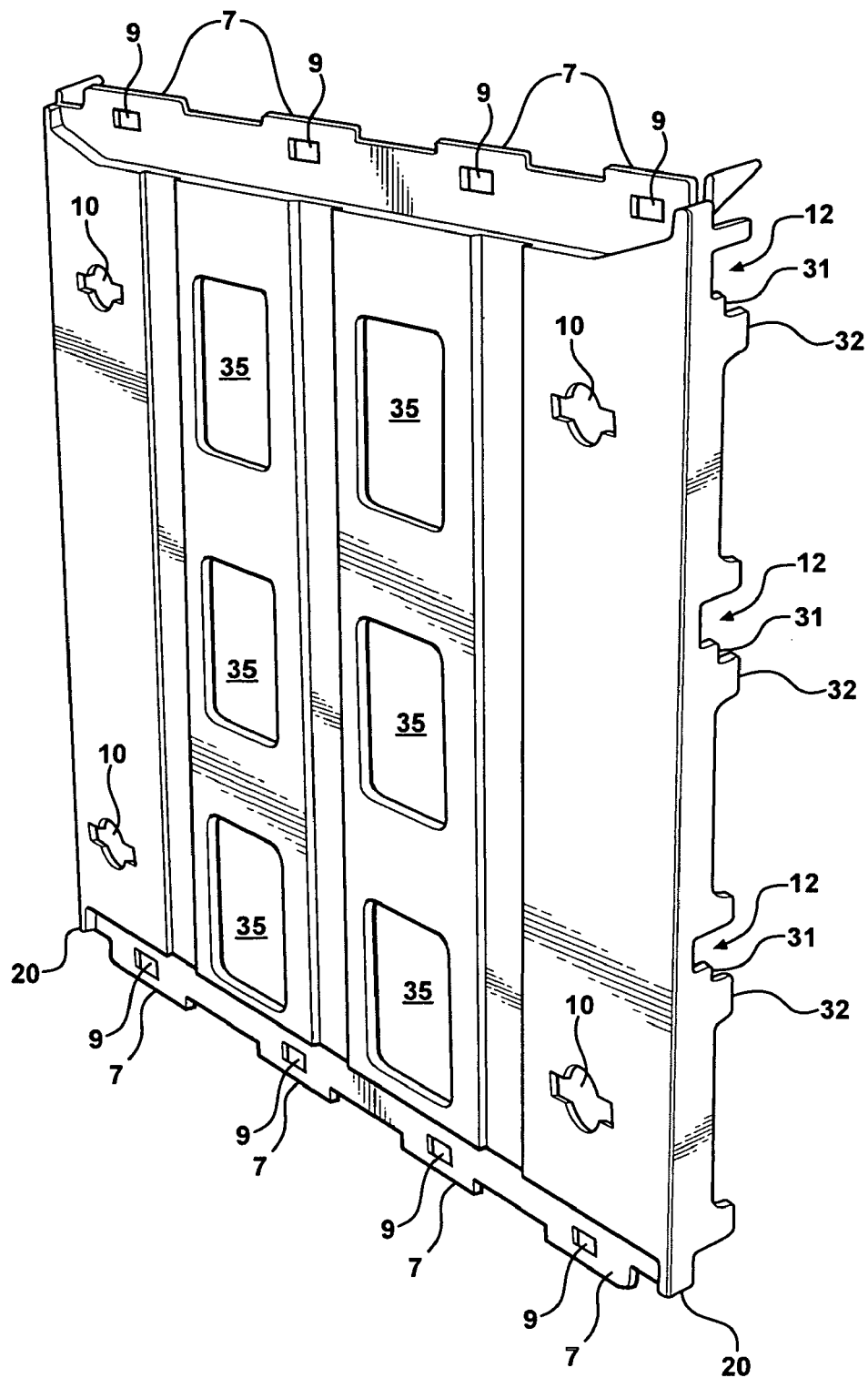
FIG. 6B is a perspective view of the outside of the side panel of FIG. 6A.

FIG. 6A is a perspective view of the inside of a side panel according to one embodiment of the present invention. FIG. 6B is a perspective view of the outside of the side panel of FIG. 6A. As shown in FIGS. 6A and 6B the top and bottom edges of the side panel 3 includes a plurality of stepped projections 7 having through-holes 9 formed therein. In addition, the top and bottom edges of the side panels 3 are provided with a plurality of spaced apart bracing members 25 which outward from the inner surface of the side panel 3 and are configured to brace the side panel 3 against an adjacent top or bottom panel 1, 2 at a right angle.

The tray support channels 12 discussed above that are configured to slidingly receive and support the side edges of trays 13 (FIG. 1) include a lower substantially linear wall 26 that defines the bottom of a tray support channel 12 and an upper wall 27 that defines the top of the tray support channel 12. The end portions 28 of the upper wall 27 are inclined upward at an angle that allows a tray 14 to be inserted in and removed from the tray support channels 12 at an angle. In this regard, the trays 13 are provided guides 14 that are received in the tray support channels 12, which guides 14, are provided with stop abutments 30 that prevent the trays 13 from accidentally being pulled completely out of the storage units. The upward inclined end portions 28 of the upper wall 27 of the tray support channels 12 allows the tray 13 to be lifted or inclined upward so that the stop abutment 30 can clear stops 31 that are provided on ends of the tray support channels 12. Adjacent stops 32 prevent the trays 13 from being accidentally opened. The space between the lower and upper walls 26, 27 provides sufficient clearance to allow the trays 13 to be lifted upward to clear stops 32 for opening the trays 13.

The side panels 3 have fastening through-holes 10 located near the corners thereof. In the illustrated embodiment, the fastening through-holes 10 have a circular central portion 21 and diametrically opposed radially extending slots 22. This particular configuration of the fastening through-holes 10 is designed to receive a twist-lock fastener 11 (FIG. 7) that includes a circular shaft 23 with diametrically opposed protrusions 24 that extend radially outward at the end of the circular shaft 23.

FIG. 6A depicts various strengthening ribs/structures, including annular walls 34 that surround the fastening through-holes 10. In addition, weight/material reducing openings 35 are formed in the side panels 3 as shown. The configuration of the strengthening ribs/structures and weight/material reducing openings can be varied as desired.

The outer side of the side panel 3 depicted in FIG. 6B presents a flat profile (having some recessed areas in the illustrated embodiment) that allows adjacent modular storage units to be positioned and fastened together using fasteners that are inserted through aligned fastening through-holes 10.

It is noted that the side panels 3 have a symmetrical shape on either side of the horizontal center. This allows the side panels 3 to be used on either the left or right side when assembling the modular storage units.

Figure 7:
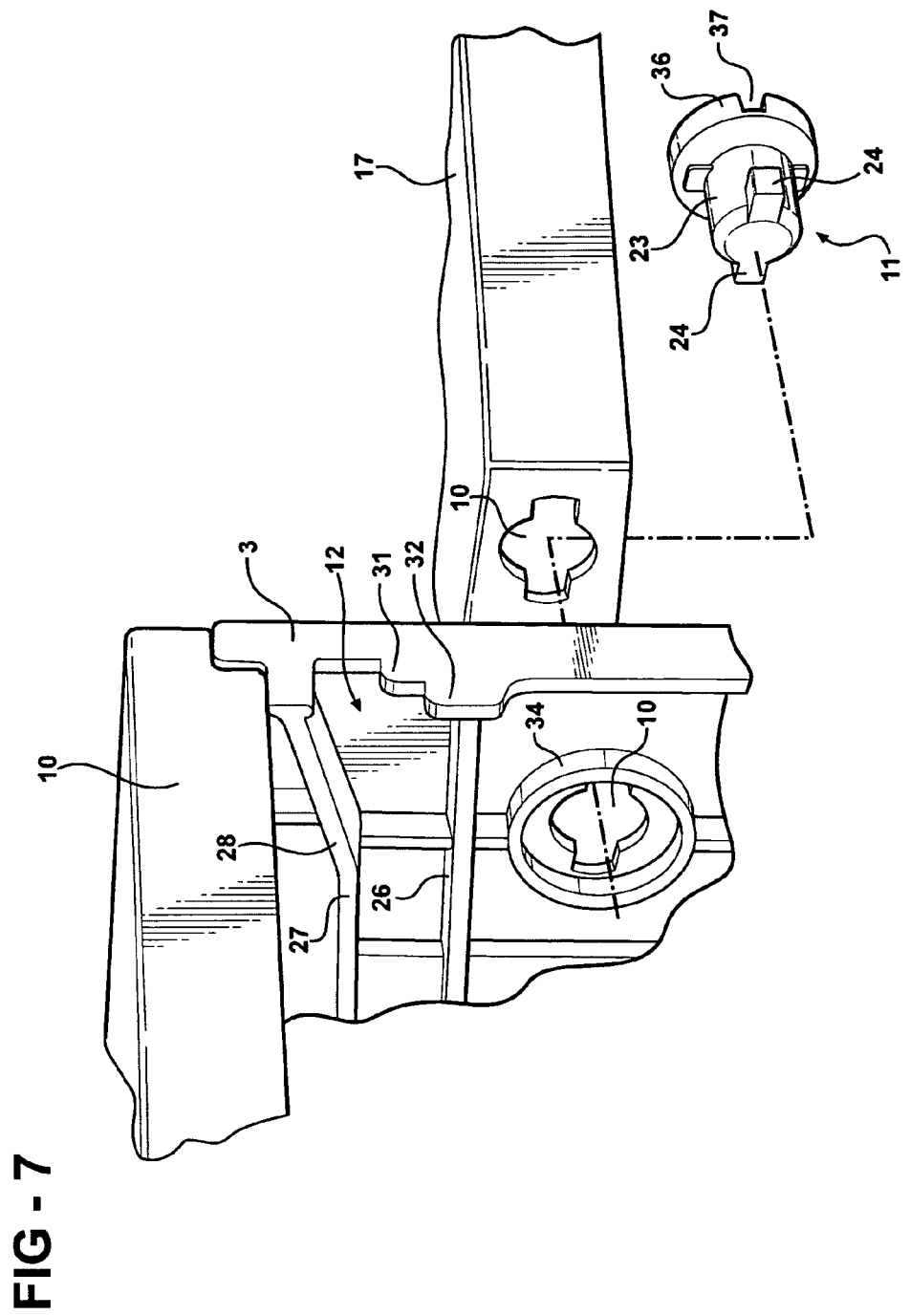
FIG. 7 illustrates one manner in which the twist-lock fasteners of the present invention are used.

FIG. 7 illustrates one manner in which the twist-lock fasteners of the present invention are used. The twist-lock fasteners 11 include a head portion 36 that is configured to be turned by a tool. In a basic embodiment, the head portion 36 can include a linear groove or slot 37 that is configured to receive a regular screw driver. Otherwise and the top of the head portion 36 can be configured in any desired manner to cooperate with a tool that is used to rotate the fastener 11. A circular shaft 23 extends from the head portion 36 of the twist-lock fastener 11 and includes diametrically opposed protrusions 24 which extend radially outward at an end of the shaft 23 and diametrically opposed detent members which extend radially outward from an end of the shaft 23 adjacent the head, the diametrically opposed protrusions 24 are offset from the detent members by 90 degrees, and are configured to pass through the diametrically opposed radially extending slots 22 of the fastening through-holes 10. The surfaces of the protrusions 24 which face the head portion 36 can be oppositely angled, tapered or beveled in order to more easily rotationally engage the surface of a side panel 3 against which the protrusions 24 are turned when the twist-lock fastener 11 is rotated. FIG. 7 depicts the fastening of a shelf 17 to a side panel 3 which is part of a modular storage unit.

The use of the twist-lock fasteners 11 eliminates the need for fasteners that requires washers or nuts, the use of which requires access to both sides of a fastening joint. Also the twist-lock fasteners 11 are designed and configured so as not to become lose or disengaged due to vibration, shaking, etc. which the storage units can experience when assembled in a work vehicle such as a van. As an alternative to the twist-lock fasteners 11, other mechanical fasteners could be used, including threaded fasteners or twist-lock fasteners having different configurations.

Figure 8:
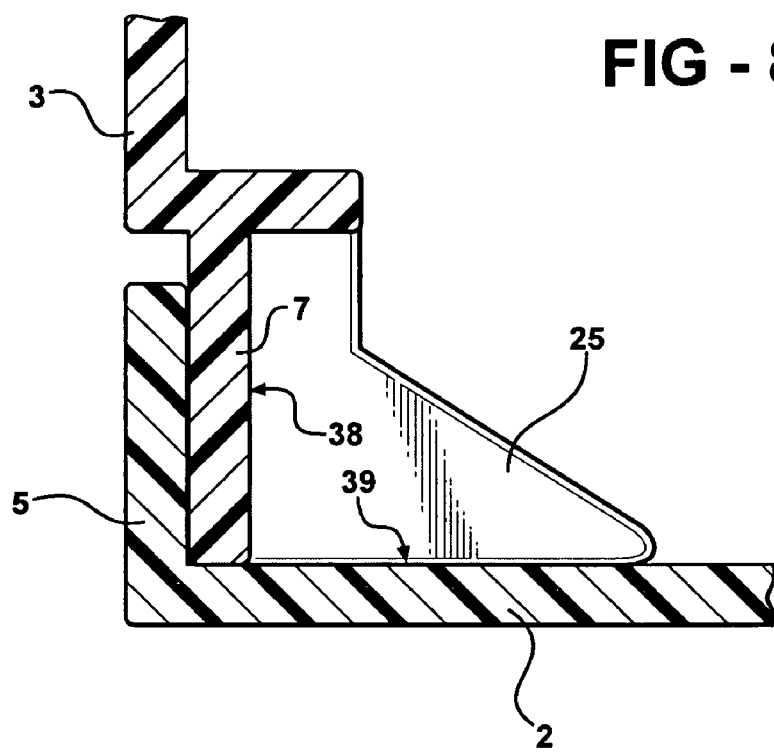
FIG. 8 is a sectional view which depicts position of the bracing members of the side panels when the side panels are joined to the top/bottom panels.

FIG. 8 is a sectional view which depicts position of the bracing members of the side panels when the side panels are joined to the top/bottom panels. As shown, the bracing members 25 have a right angle triangular shape with one leg 38 fixed to the side panels 3 and an adjacent leg 39 configured to provide a brace against an adjacent top or bottom panel 1, 2. This bracing effect stabilizes and strengthens the modular storage units.

Figure 9:
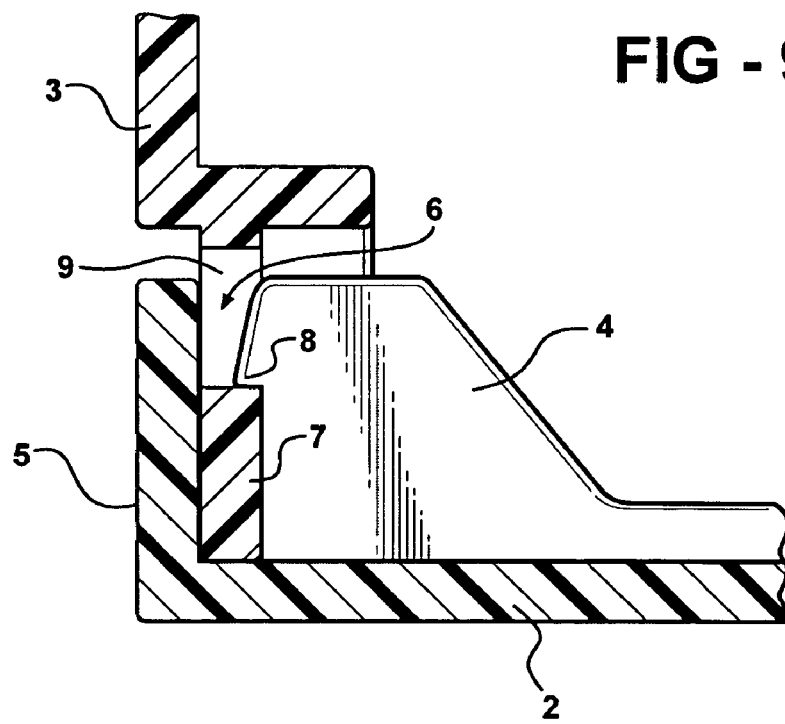
FIG. 9 is a sectional view which depicts the position of the projections on the side panels when the side panels are joined to the top/bottom panels.

FIG. 9 is a sectional view which depicts the position of the projections on the side panels when the side panels are joined to the top/bottom panels. FIG. 9 best shows how the projections 7 of the side panels 3 are received in the gaps 6 defined between the engagement structures 4 and the side walls 5 of the top or bottom panels 1, 2. FIG. 9 also depicts how the catches 8 formed on the engagement structures 4 snap-fit into through-holes 9 provided in the projections 7 of the side panels 3.

Figure 10:
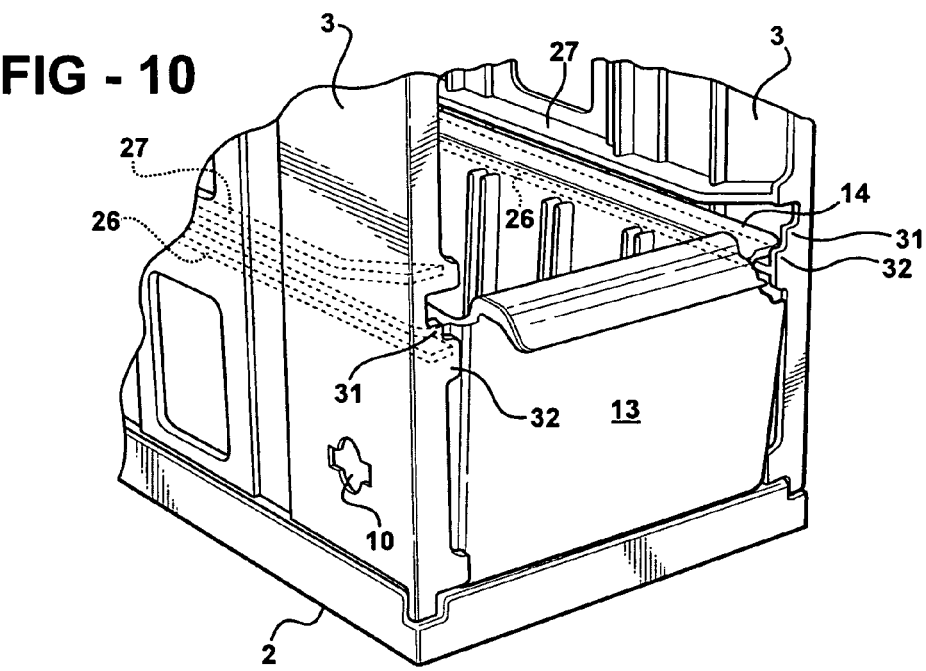
FIG. 10 is an enlarged view of the tray that shows the tray in a stopped position that prevents the tray from being open.

FIG. 10 is an enlarged view of the tray that shows the tray in a stopped position that prevents the tray from being open. In FIG. 10 the guide 14 of tray 13 that slidingly supports the tray 13 in the support channels 12 is depicted as abutting stop 32. In this manner, the tray 13 is prevented from accidentally coming open. To open the tray 13 one lifts the front of the tray so that the front end of guide 14 clears stop 32 and then slides the tray 13 open. As noted above, there is sufficient space between the lower and upper walls 26, 27 that form tray support channel 12 to allow the tray 13 to be lifted up enough to allow the guide 14 to clear stop 32.

Figure 11:
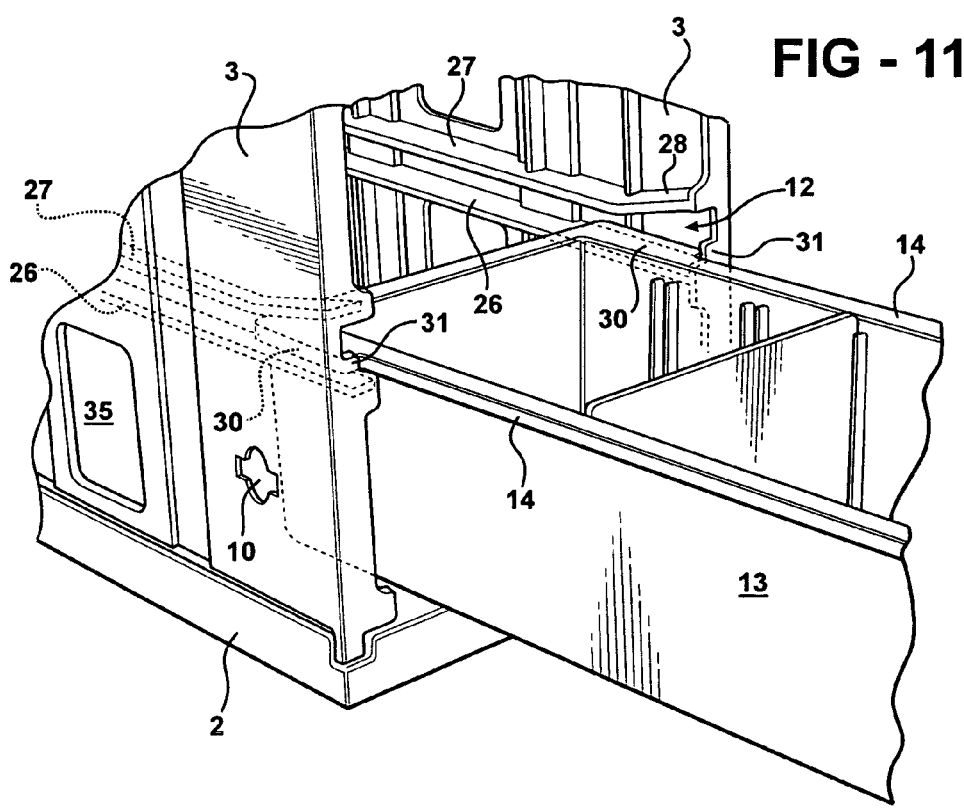
FIG. 11 is an enlarged view of the tray that shows the tray in a stopped position that prevents the tray from being removed from the storage unit.

FIG. 11 is an enlarged view of the tray that shows the tray in a stopped position that prevents the tray from being removed from the storage unit. In FIG. 11, the stop abutment 30 on the back of the guide 14 of tray 13 is shown as abutting stop 31. To clear stop 31 and remove the tray 13, the tray 13 can be lifted upward. In this regard, the inclined end portions 28 of the upper walls 27 of the tray support channels 12 are provided to allow trays 13 to be lifted up at an angle for removal or insertion into the modular storage units.

It is noted that the storage units of the present invention are not shown as including back sides or back panels. Nevertheless, it is within the scope of the present invention to provide either individual back panels for the individual modular storage units or back panels that are configured to the shape of an overall storage system that comprises a plurality of the individual modular storage units. Such back panels can be snapped, clipped or fastened on using any suitable type of mechanical fasteners. In general however, storage systems assembled from the modular storage units of the present invention are positioned against a wall of some structure and do not require back panels.

It is noted also that the storage units and systems of the present invention are not limited for use in work vehicles. In this regard, the storage units and systems of the present invention can be assembled and used in any work or storage area, including shops, garages, basements, etc. and use to store any type of articles.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A modular storage unit comprising:
   a top panel having a body with a top surface and bottom surface, a sidewall surrounding a peripheral edge of the top panel, and an engagement structure projecting from the bottom surface and spaced a predetermined distance apart from the sidewall by a gap, and a fastening through-hole formed in the top panel body having a circular shape and an orientation notch extending from an edge of the fastening through hole;
   a bottom panel having a body with a top surface and bottom surface, a sidewall surrounding a peripheral edge of the bottom panel, and an engagement structure projecting from the bottom surface and spaced a predetermined distance apart from the sidewall by a gap, and a fastening through-hole formed in the bottom panel body and having a circular shape and an orientation notch extending from an edge of the fastening through hole, wherein the bottom panel is positioned opposite the top panel; and
   opposed side panels, wherein each side panel is generally planar and includes a top edge, and opposed bottom edge, and side edges extending between the top edge and bottom edge and each side panel top edge and side panel bottom edge includes a plurality of stepped projections having a through hole formed therein, and a fastening through-hole formed in each side panel body and having a circular shape and an orientation notch extending from an edge of the fastening through-hole;
   wherein the side panel top edge stepped projection is disposed within the top panel gap and the side panel bottom edge is disposed within the bottom panel gap such that the top panel, bottom panel and opposed side panels are snap-fit assembled together;
   wherein the top panel and bottom panel engaging structures include a catch that is disposed in the corresponding side panel through-hole; and
   a twist-lock fastener used to fasten adjacent modular storage units together, wherein the twist lock includes a head, a shaft extending from the head, diametrically opposed protruding extending radially outward from a free end of the shaft and diametrically opposed detent members extending radially outward from an end of the shaft that is adjacent the head, and the protruding members are offset from the detent members by 90 degrees, such that the shank is disposed in any one of the fastening through-holes of the opposed sided panels or the fastening through-holes of the top or bottom panels, and rotation of the shaft engages the shaft detent member to lock the twist-lock fastener in place.

2. The modular storage unit according to claim 1, wherein a plurality of modular storage units each having different sized top panels and bottom panels are joined together.

3. The modular storage unit according to claim 1, wherein the top and bottom panels are structurally identical.

4. The modular storage unit according to claim 1, wherein the side panels are structurally identical.

5. The modular storage unit according to claim 1, further comprising a shelf having a fastening through-hole formed therein with a circular shape and an orientation notch extending from an edge of the fastening through-hole so that the shelf can be fastened to the modular storage unit by the twist-lock fastener.

6. The modular storage unit according to claim 1, further including a tray that can be slidingly received in the modular storage unit.

7. The modular storage unit according to claim 1, wherein the top, bottom and side panels include a plurality of fastener through-holes that are each configured to receive a corresponding twist-lock fastener therein.

8. The modular storage unit according to claim 7, wherein the top panel or bottom panel fastener through-holes are arranged in a common pattern.

9. The modular storage unit according to claim 1, further comprising a bracing member provided on the projection which brace the side panels at right angles against the top and bottom panels.

10. The modular storage unit according to claim 1, wherein the side panels are provided with tray support channels configured to slidingly receive and support trays therein.

11. The modular storage unit according to claim 1, further comprising a shelf member fastened between adjacent modular storage units using a corresponding twist-lock fastener.

12. The modular storage unit according to claim 1, wherein the top panel side wall and bottom panel side wall each have cut-out corner portions which are configured to receive corner posts extending from the side panel.

13. The modular storage unit according to claim 1, wherein either one of the top panel fastening through-hole, bottom panel fastening through-hole or side panel fastening through-hole includes a wall portion.

14. A method for assembling a modular storage unit assembly, said method including the steps of:
- assembling a top panel having a body with a top surface and bottom surface, a sidewall surrounding a peripheral edge of the top panel, and an engagement structure comprising a catch projecting from the bottom surface and spaced a predetermined distance apart from the sidewall by a gap, and a fastening through-hole formed in the top panel body and having a circular shape and an orientation notch extending from an edge of the fastening through-hole, to a side panel having a body with a top edge and opposed bottom edge, and side edges extending between the top edge and bottom edge and each side panel top edge and side panel bottom edge includes a plurality of stepped projections having a through hole formed therein, and a fastening through-hole having a circular shape and an orientation notch extending from an edge of the fastening through hole, by engaging the top panel engagement structure in the side panel projection through hole;
- assembling a second side panel having a body with a top edge and opposed bottom edge, and side edges extending between the top edge and bottom edge and each side panel top edge and side panel bottom edge includes a plurality of stepped projections having a through-hole formed therein, and a fastening through-hole having a circular shape and an orientation notch extending from an edge of the fastening through-hole, by engaging the top panel catch in the engagement structure in the second side panel projection through-hole;
- assembling a bottom panel having a body with a top surface and bottom surface, a sidewall surrounding a peripheral edge of the bottom panel, and an engagement structure comprising a catch projecting from the top surface and spaced a predetermined distance apart from the sidewall by a gap, and a fastening through-hole formed in the bottom panel body having a circular shape and an orientation notch extending from an edge of the fastening through-hole, to the first side panel and second side to form the modular storage structure.

15. The method of claim 14 further comprising the steps of:
- joining together individual modular storage structures using a twist-lock fastener having a head, a shaft extending from the head, diametrically opposed protruding members extending radially outward from a free end of the shaft and diametrically opposed detent members extending radially outward from an end of the shaft that is adjacent the head, and the protruding members are offset from the detent members by 90 degrees, such that the shank is disposed in any of the fastening through-holes of the side panels or fastening through-holes of the top or bottom panels; and
- rotating the twist-lock fastener shaft to engage the shaft detent member and lock the twist-lock fastener in place.

* * * * *